US008214276B1

(12) United States Patent
Preece et al.

(10) Patent No.: US 8,214,276 B1
(45) Date of Patent: Jul. 3, 2012

(54) METHOD AND SYSTEM FOR PROVIDING RELATIVE FINANCIAL POSITION DATA

(75) Inventors: Richard Preece, San Diego, CA (US);
Vidya Dinamani, San Diego, CA (US);
Alan Tifford, San Diego, CA (US);
David Duayne Taylor, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 319 days.

(21) Appl. No.: 12/361,693

(22) Filed: Jan. 29, 2009

(51) Int. Cl.
*G06Q 40/00* (2012.01)
(52) U.S. Cl. ......................................... 705/36 R; 705/35
(58) Field of Classification Search ..................... 705/35, 705/36 R, 36 T
See application file for complete search history.

(56) References Cited

U.S. PATENT DOCUMENTS

| | | | | |
|---|---|---|---|---|
| 4,985,833 | A * | 1/1991 | Oncken | 705/42 |
| 6,049,782 | A * | 4/2000 | Gottesman et al. | 705/36 R |
| 7,383,218 | B1 * | 6/2008 | Oros | 705/36 R |
| 7,676,408 | B2 * | 3/2010 | Moebs et al. | 705/35 |
| 7,716,104 | B2 * | 5/2010 | Cook et al. | 705/36 T |
| 7,908,182 | B1 * | 3/2011 | Gupta | 705/26.7 |
| 2003/0172287 | A1 * | 9/2003 | Bailo et al. | 713/193 |
| 2004/0064331 | A1 * | 4/2004 | Mayer et al. | 705/1 |
| 2004/0225548 | A1 * | 11/2004 | Aldrich et al. | 705/8 |
| 2005/0065872 | A1 * | 3/2005 | Moebs et al. | 705/38 |

OTHER PUBLICATIONS

Gore, Jennifer P "Software puts a certified financial planner in a PC " Dec. 1996 Bank Marketing v28n12 pp. 68.*
Schaff, William "Great expectations for Intuit" Mar. 23, 1998 Informationweek n674 pp. 178.*
anonymous Quicken 2003 for Windows Helps Customers Optimize Their Finances Aug. 21, 2002, Business Wire, 2070.*
Hamilton, Brian "Making Numbers Understandable "Aug. 2005 Practical Accountant pp. 9.*
Anonymous "Making Apr. 15 Less Taxing" Mar. 7, 1997 Prnewswire.*

* cited by examiner

*Primary Examiner* — Kelly Campen
(74) *Attorney, Agent, or Firm* — McKay and Hodgson, LLP; Philip McKay; Sean P. Lewis

(57) ABSTRACT

A method and system for providing relative financial position data whereby actual financial data, such as, but not limited to, overall financial position data, income and asset data, expense data, and transactional data, and/or demographic data for various individuals is obtained from one or more sources. A given individual's actual financial transaction data is then compared with other individuals that are determined to be similarly situated with the given individual. The given individual is then provided one or more graphical displays and/or data displays showing a comparison between the given individual's own financial data and/or position and the average financial data and/or position of similarly situated individuals.

24 Claims, 4 Drawing Sheets

RELATIVE FINANCIAL POSITION ALERT

401
1. YOUR FINANCIAL DATA INDICATES TOTAL UNSECURED DEBT 34% HIGHER THAN THE AVERAGE FOR SIMILARLY SITUATED INDIVIDUALS.

403
2. YOUR FINANCIAL DATA INDICATES A MORTGAGE PAYMENT THAT 27% HIGHER THAN THE AVERAGE FOR SIMILARLY SITUATED INDIVIDUALS.

CLICK HERE FOR MORE DETAILS
405

METHOD AND SYSTEM FOR PROVIDING RELATIVE FINANCIAL POSITION DATA

BACKGROUND

For most individuals, being aware of, and monitoring, the state of their finances and tracking their overall financial situation or "financial health" has always been an extremely important and fundamental responsibility. Unfortunately, due to a lack of time, limits of currently available resources, and in some instances, a lack of motivation, many individuals have historically failed to recognize and accept this responsibility. However, recent economic events have reminded many individuals of the urgent need to know, and monitor, the state of their finances and financial health.

Several computing system implemented financial management systems are currently available to help an individual, or an authorized user on behalf of an individual, gather an individual's own financial data and/or process/analyze that individual's own financial data. Typically, these currently available computing system implemented financial management systems provide an individual/user with financial data such as, but not limited to, the individual's overall financial position data, the individual's income data, the individual's expense data, and the individual's transactional data, all directed solely to the individual's own situation and/or activities. However, many, if not most, individuals desire, and/or would significantly benefit from, data indicating how the given individual's financial data and/or financial position compares with the financial data and/or financial position associated with similarly situated individuals.

In addition, some currently available computing system implemented financial management systems provide users limited and highly generalized financial statistics and/or recommendations/guidelines. However, the highly generalized statistics and/or recommendations/guidelines, at least those available at a relatively reasonable cost, are often of limited value to the user since the statistics and/or recommendations/guidelines are based on general spending assumptions and overly broad groupings that do not necessarily apply to the individual's specific financial situation, the individual's specific financial data, or the given individual's peers. Consequently, the currently available generalized "rule of thumb" statistics and/or recommendations/guidelines usually fail to provide the user/individual with any truly useful data, or the necessary motivation to modify their spending habits in order to establish more sound financial practices.

On the other hand, any specifically customized financial analysis and/or recommendations/guidelines are often expensive, and time consuming, to obtain and this advice still typically fails to show a user how the individual's specific financial data compares with the actual financial data of similarly situated individuals. In addition, specifically customized financial analysis reports are typically lengthy and detailed reports that include text and data presented in a format that is time consuming to review, difficult to understand, and otherwise not particularly user friendly or helpful to individuals who desire to visualize their relative financial health displayed in a clear and concise manner.

As a result of the situation described above, many individuals have no idea how their financial situation really compares to similarly situated individuals. Consequently, using currently available computing system implemented financial management systems, individuals fail to benefit from comparative analysis and the "wisdom of the masses" that has become available with the advent of the Internet, improved processing power, and improved data storage.

SUMMARY

In accordance with one embodiment, a method and system for providing relative financial position data includes a process for providing relative financial position data whereby, in one embodiment, actual financial data, such as, but not limited to, overall financial situation data, income and asset data, expense data, and transactional data, and/or demographic data for various individuals is obtained from one or more sources, in one embodiment, using a computing system implemented financial management system. In one embodiment, individuals are then categorized according to one or more financial characterization parameters based on their associated financial data. In one embodiment, a given individual's actual financial transaction data is then compared with the actual financial transaction of other individuals that are determined to be similarly situated. In one embodiment, the given individual is then provided one or more graphical displays and/or data displays showing a comparison between the individual's own financial data and/or position and the average financial data and/or position of similarly situated individuals. In one embodiment, the individual is also provided advice regarding any specific changes the individual might wish to make in order to better align him/her self with the average financial data and/or position of similarly situated individuals.

In one embodiment, the financial data associated with the various individuals and/or the given individual includes, but is not limited to: the individual's age; the individual's area of residence; the individual's marital status; the individual's dependents; the individual's occupation; the individual's income, and/or household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage payments; the individual's equity in real estate; the individual's stocks and other holdings; the individual's healthcare expenses; the individual's financial transaction data, including specific spending in defined categories and/or with specific merchants; and/or any other financial and/or demographic data desired/defined by the provider of the process for providing relative financial position data and/or a user of the process for providing relative financial position data.

In one embodiment, access to the financial data associated with the various individuals and/or the given individual is obtained through a computing system implemented financial management system that implements, includes, is accessible by, and/or is otherwise associated with the process for providing relative financial position data. Herein, a computing system implemented financial management system can be, but is not limited to, any of the following: a computing system implemented personal and/or business financial management system; a computing system implemented home and/or business inventory system; a computing system implemented personal and/or business asset management system; a computing system implemented personal and/or business accounting system; a computing system implemented personal and/or business tax preparation system; a computing system implemented healthcare management system; and/or any of the numerous computing system implemented data management systems discussed herein, and/or known to those of skill in the art at the time of filing, and/or as developed after the time of filing.

In one embodiment, the financial data associated with the various individuals and/or the given individual is provided to, and/or entered into, and/or transferred to, and/or downloaded to, and/or otherwise obtained by, the process for providing relative financial position data and/or a computing system implemented financial management system associated with the process for providing relative financial position data from the user/individuals, a bank, credit card company, a credit reporting agency or bureau, and/or any other financial institution or data source via any network or network system, as discussed herein, and/or available or known at the time of filing, and/or as later developed.

In one embodiment, the financial data associated with the various individuals and/or the given individual is provided to, and/or entered into, and/or transferred to, and/or downloaded to, and/or otherwise obtained by, the process for providing relative financial position data, and/or a computing system implemented financial management system associated with the process for providing relative financial position data, from the user/individuals, a bank, credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, the financial data associated with the various individuals and/or the given individual is provided to, and/or entered into, and/or transferred to, and/or downloaded to, and/or otherwise obtained by, the process for providing relative financial position data, and/or a computing system implemented financial management system associated with the process for providing relative financial position data, from a database maintained by the user/individuals, a bank, a credit card company, credit reporting agency or bureau, and/or any other financial institution or data source, as discussed herein, and/or available or known at the time of filing, and/or as later developed.

In one embodiment, the financial data associated with the various individuals and/or the given individual is provided to, and/or entered into, and/or transferred to, and/or downloaded to, and/or otherwise obtained by, the process for providing relative financial position data, and/or a computing system implemented financial management system associated with the process for providing relative financial position data, from the user/individuals, a bank, credit card company, a credit reporting agency or bureau, and/or any other financial institution or data source by embedding the data in, or on, a computer program product, as defined herein and providing the computer program product to the provider of computing system implemented financial management system associated with the process for providing relative financial position data and/or the process for providing relative financial position data.

In one embodiment, the financial data associated with the various individuals and/or the given individual is provided to, and/or entered into, and/or transferred to, and/or downloaded to, and/or otherwise obtained by, the process for providing relative financial position data, and/or a computing system implemented financial management system associated with the process for providing relative financial position data, from the user/individuals, a bank, credit card company, a credit reporting agency or bureau, and/or any other financial institution or data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, the individuals' financial data is then analyzed by the process for providing relative financial position data to categorize individuals into categories and/or groupings based on one or more of various defined financial categorization criteria/parameters such as, but not limited to: age; area of residence; marital status; dependents; occupation; income; average contributions to saving accounts and/or programs over a given time; savings account balances; average contributions to retirement accounts and/or programs over a given time; balances in retirement accounts and/or programs; average balances in checking; mortgage payments; equity in real estate; stocks and other holdings; healthcare expenses; financial transaction data, including specific spending in defined categories and/or with specific merchants; and/or any other financial and/or demographic data desired/defined by the provider of the process for providing relative financial position data and/or a user of the process for providing relative financial position data.

In one embodiment, a given individual's financial data is then obtained by any of the methods, means, processes and/or procedures discussed herein above, and/or known in the art at the time of filing, and/or as developed after the time of filing. In one embodiment, the given individual's financial data is then analyzed and compared with other the financial data from other individuals that are identified by the process for providing relative financial position data as being similarly situated and/or are in the given individual's category and/or group as identified using the various defined financial categorization criteria/parameters discussed above. In one embodiment, the one or more defined financial categorization criteria/parameters used to categorize the given individual are defined by the provider of the process for providing relative financial position data, and/or the given individual, and/or a user of the process for providing relative financial position data.

In one embodiment, the given individual is then provided one or more graphical displays and/or data displays showing a comparison between the individual's own financial position and the average financial position of the identified similarly situated individuals in the form of any symbol or graphical display capable of visually showing the individual's own financial position relative to the average financial position of the identified similarly situated individuals. As an example, a thermometer, a sliding scale, any graphical representation, or any partially filled figure or symbol, or outline thereof, may be used. Moreover, these symbols, graphical displays, and scales may, in some embodiments, display either the individual's own financial position relative to the average financial position of the identified similarly situated individuals or the differential between the individual's own financial position relative to the average financial position of the identified similarly situated individuals.

In one embodiment, the given individual is provided data representing a comparison between the individual's own financial position and the average financial position of the identified similarly situated individuals in the form of a summary report.

In one embodiment, the given individual is provided an alert containing data regarding the individual's own financial position and the average financial position of the identified similarly situated individuals.

In one embodiment, the one or more graphical displays and/or data displays showing a comparison between the individual's own financial position and the average financial position of the identified similarly situated individuals, and/or alerts, are displayed on any display device accessible by the individual such as discussed herein, and/or known in the art at the time of filing, and/or as developed after the time of filing. In one embodiment, the display device is associated with any computing system discussed herein, and/or known in the art at the time of filing, and/or as developed after the time of filing.

In one embodiment, the given individual is provided one or more graphical displays and/or data displays showing a comparison between the individual's own financial position and the average financial position of the identified similarly situated individuals by providing the individual, or any authorized user, access to one or more websites.

In one embodiment, the given individual is provided one or more graphical displays and/or data displays showing a comparison between the individual's own financial position and the average financial position of the identified similarly situated individuals by giving the individual, or any authorized user, access to any database, computing system, and/or a server system, or any web-site or other web-based system, associated with the process for providing relative financial position data.

In one embodiment, the given individual is provided one or more graphical displays and/or data displays showing a comparison between the individual's own financial position and the average financial position of the identified similarly situated individuals using a computer program product as discussed herein.

In one embodiment, the given individual is provided one or more graphical displays and/or data displays showing a comparison between the individual's own financial position and the average financial position of the identified similarly situated individuals through, and/or from, a computing system implemented financial management system that is a parent system for, implements, and/or is otherwise associated with, the process for providing relative financial position data.

In one embodiment, the given individual is provided one or more graphical displays and/or data displays showing a comparison between the individual's own financial position and the average financial position of the identified similarly situated individuals through, and/or from, a computing system implemented data management system that is a parent system for, implements, and/or is otherwise associated with, the process for providing relative financial position data.

In one embodiment, the given individual is provided one or more graphical displays and/or data displays showing a comparison between the individual's own financial position and the average financial position of the identified similarly situated individuals through any network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, the given individual is provided one or more graphical displays and/or data displays showing a comparison between the individual's own financial position and the average financial position of the identified similarly situated individuals through e-mail or through text messaging.

In one embodiment, the given individual is provided one or more graphical displays and/or data displays showing a comparison between the individual's own financial position and the average financial position of the identified similarly situated individuals using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, the given individual is also provided access to data representing advice regarding any recommended changes and/or allocation of funds the individual might wish to make in order to better align the individual's own financial position with the average financial position of the identified similarly situated individuals.

Using the method and system for providing relative financial position data disclosed herein, an individual's actual financial data is used to provide the individual with a specific comparison between the individual's actual financial position and/or activity and the financial position and/or activity of similarly situated individuals based on the actual financial data of the similarly situated individuals.

Consequently, using the method and system for providing relative financial position data disclosed herein, individuals can benefit from comparative analysis potentially available with the advent of the Internet, improved processing power, and improved data storage.

As discussed in more detail below, using the below embodiments, with little or no modification and/or user input, there is considerable flexibility, adaptability, and opportunity for customization to meet the specific needs of various users under numerous circumstances.

Figure 1:
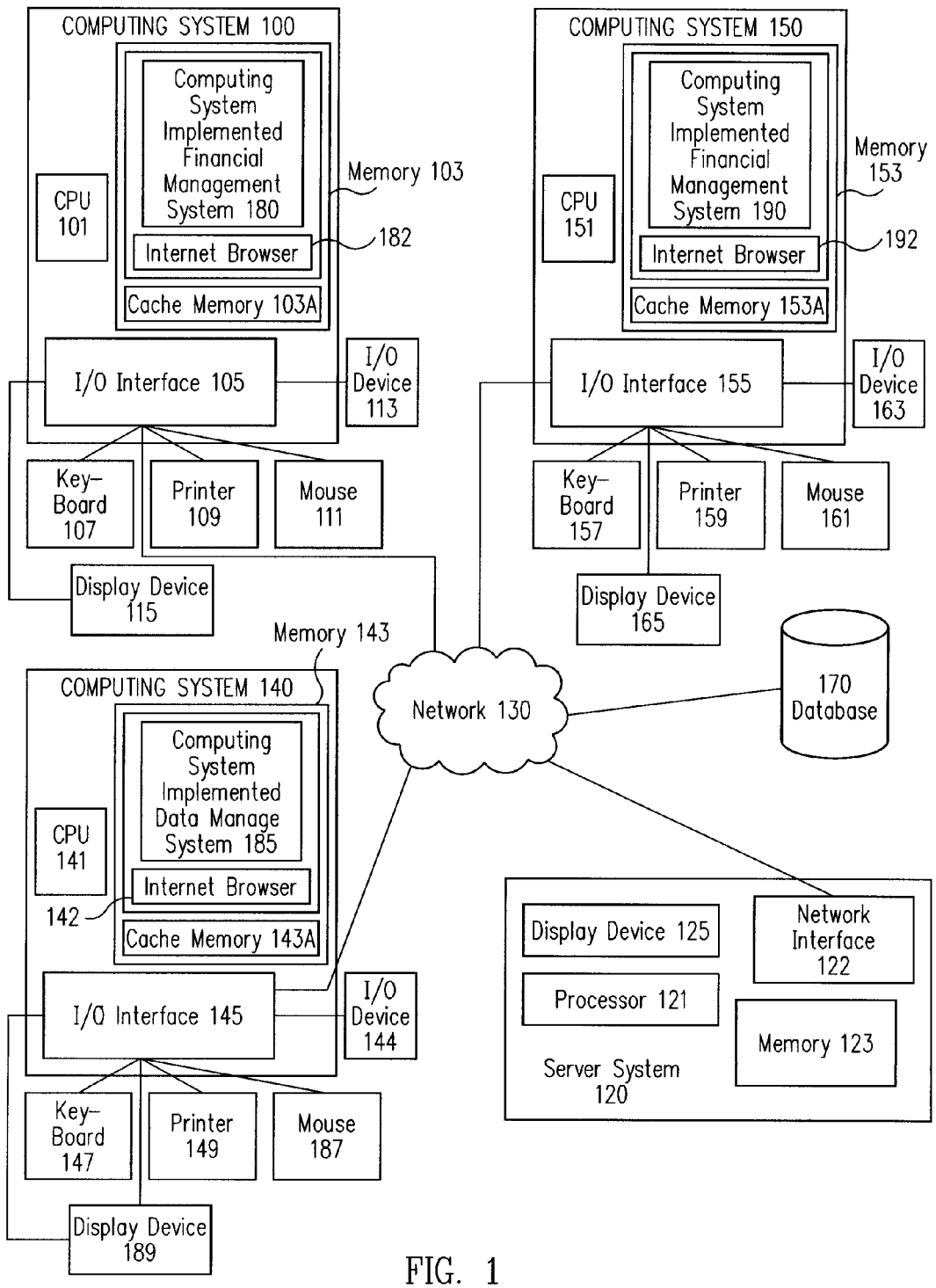
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing relative financial position data includes a process for providing relative financial position data whereby, in one embodiment, actual financial data, such as, but not limited to, overall financial situation data, income and asset data, expense data, and transactional data, and/or demographic data for various individuals is obtained from one or more sources, in one embodiment, using a computing system implemented financial management system. In one embodiment, individuals are then categorized according to one or more financial characterization parameters based on their associated financial data. In one embodiment, a given individual's actual financial transaction data is then compared with the actual financial transaction of other individuals that are determined to be similarly situated. In one embodiment, the given individual is then provided one or more graphical displays and/or data displays showing a comparison between the individual's own financial data and/or position and the average financial data and/or position of similarly situated individuals. In one embodiment, the individual is also provided advice regarding any specific changes the individual might wish to make in order to better align him/her self with the average financial data and/or position of similarly situated individuals.

FIG. 1 is a block diagram of an exemplary hardware architecture for implementing one embodiment of a system and method for providing relative financial position data, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented financial management system 180, such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for providing relative financial position data (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing relative financial position data, and/or a computing system implemented financial management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, financial data associated with one or more individuals is stored, in whole, or in part, in memory system 103, and is used by, or is accessed by, a process for providing relative financial position data and/or one or more users. In one embodiment, computing system 100 is a computing system accessible by one or more users. In one embodiment, computing system 100 is used, and/or accessible, by another computing system, such as computing systems 150 and/or 140 (discussed below).

In one embodiment, computing system 100 is used, controlled, provided, and/or otherwise associated with an authorized user that is a representative of the individual, a financial institution and data representing all, or part, of financial data associated with a given individual, is stored in computing system 100.

Computing system 100 can be any computing system as defined herein and/or as known in the art at the time of filing and/or as developed thereafter, that includes components that can execute all, or part, of a process for providing relative financial position data, and/or a computing system implemented financial management system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a computing system implemented financial management system 190, such as any computing system implemented financial management system defined herein, known in the art at the time of filing, and/or as developed thereafter. In one embodiment, computing system implemented financial management system 190 is stored, in whole, or in part, in memory system 153, and is used by, or includes, or is accessed by, and/or is otherwise associated with a process for providing relative financial position data (not shown in FIG. 1, see FIG. 2).

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for providing relative financial position data, and/or a computing system implemented financial management system, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that, in one embodiment, includes a search engine (not shown) and is stored, in whole, or in part in memory 153.

In one embodiment, data associated one or more individuals is stored, in whole, or in part, in memory system 153, and is used by, or is accessed by, a process for providing relative financial position data and/or one or more users. In one embodiment, computing system 150 is a computing system accessible by one or more users. In one embodiment, computing system 150 is used, and/or accessible, by another computing system, such as computing systems 100 and/or 140 (discussed below).

Computing system 150 can be any computing system as defined herein and/or as known in the art at the time of filing and/or as developed thereafter, that includes components that can execute all, or part, of a process for providing relative financial position data, and/or a computing system implemented financial management system, in accordance with at least one of the embodiments as described herein.

As also seen in FIG. 1, computing system 140 typically includes a central processing unit (CPU) 141, an input/output (I/O) interface 145, and a memory system 143, including cache memory 143A. In one embodiment, memory system 143 includes all, or part, of a computing system implemented data management system 185, such as any computing system implemented data management system defined herein, known in the art at the time of filing, and/or as developed thereafter. In one embodiment, computing system implemented data management system 185 is stored, in whole, or in part, in memory system 143, and is used by, or includes, or is accessed by, a process for providing relative financial position data (not shown in FIG. 1, see FIG. 2).

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for providing relative financial position data, and/or a computing system implemented data management system, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that, in one embodiment, includes a search engine (not shown) and is stored, in whole, or in part in memory 143.

In one embodiment, data associated with a process for providing relative financial position data and/or one or more individuals is stored, in whole, or in part, in memory system 143. In one embodiment, computing system 140 is a computing system accessible by one or more users. In one embodiment, computing system 140 is used, and/or accessible, by another computing system, such as computing systems 150 and/or 100.

Computing system 140 can be any computing system as defined herein and/or as known in the art at the time of filing and/or as developed thereafter, that includes components that can execute all, or part, of a process for providing relative financial position data, and/or a computing system implemented data management system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing relative financial position data, and/or a computing system implemented financial management system and/or a computing system implemented data management system.

In one embodiment, data associated with one or more individuals, and/or a process for providing relative financial position data, and/or one or more computing system implemented financial management systems, and/or one or more computing system implemented data management systems, is stored, in whole, or in part, in database 170, and is used by, or is accessed by, a process for providing relative financial position data. In one embodiment, database 170 is accessible by one or more users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one or more individuals, and/or a process for providing relative financial position data, and/or one or more computing system implemented financial management systems, and/or one or more computing system implemented data management systems, is stored, in whole, or in part, in server system 120, and is used by, or is accessed by, a process for providing relative financial position data. In one embodiment, server system 120 is accessible by one or more users. In one embodiment, server system 120 is used, and/or accessible, by a computing system, such as computing systems 100, 140, and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 are not relevant.

As discussed in more detail below, in one embodiment, a process for providing relative financial position data, and/or a computing system implemented financial management system, and/or a computing system implemented data management system, and/or data associated with one or more individuals, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for providing relative financial position data, and/or a computing system implemented financial management system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing relative financial position data, and/or a computing system implemented financial management system, and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for providing relative financial position data, and/or a computing system implemented financial management system, and/or a computing system implemented data management system, and/or data associated with one or more individuals, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

PROCESS

Herein, the terms "individual", "given individual", "other individuals", "user/individual", and "user" include any person, party, business, system, application, organization, and/or entity interacting with, interfacing with, contacting, viewing, providing data to, accepting data from, requesting data from, and/or otherwise associating with the process for providing relative financial position data for any purpose. In addition, herein, the terms "individual", "given individual", "other individuals", "user/individual", and "user" can be used interchangeably to denote any party using a process for providing relative financial position data, and/or a person who is the subject of, source of, and/or target of, all, or part of, any data/information obtained and/or analysis performed by a process for providing relative financial position data, and/or a legal guardian of a person who is the subject of, and/or target of, any data/information obtained and/or analysis performed by a process for providing relative financial position data, and/or an authorized agent of any party using a process for providing relative financial position data, and/or a person who is the subject of, and/or target of, any information obtained and/or analysis performed, by a process for providing relative financial position data, and/or any other authorized party associated with any party using a process for providing relative financial position data, and/or a person who is the subject of, and/or target of, any information obtained and/or analysis performed by a process for providing relative financial position data.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term computing system implemented financial management system includes, but is not limited to: computing system implemented personal and/or business financial management systems, packages, programs, modules, or applications; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filling or as developed later.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; computing system implemented financial management systems, packages, programs, modules, or applications; computing system implemented financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for providing relative financial position data includes a process for providing relative financial position data whereby, in one embodiment, actual financial data, such as, but not limited to, overall financial situation data, income and asset data, expense data, and transactional data, and/or demographic data for various individuals is obtained from one or more sources, in one embodiment, using a computing system implemented financial management system. In one embodiment, individuals are then categorized according to one or more financial characterization parameters based on their associated financial data. In one embodiment, a given individual's actual financial transaction data is then compared with the actual financial transaction of other individuals that are determined to be similarly situated. In one embodiment, the given individual is then provided one or more graphical displays and/or data displays showing a comparison between the individual's own financial data and/or position and the average financial data and/or position of similarly situated individuals. In one embodiment, the individual is also provided advice regarding any specific changes the individual might wish to make in order to better align him/her self with the average financial data and/or position of similarly situated individuals.

Figure 2:
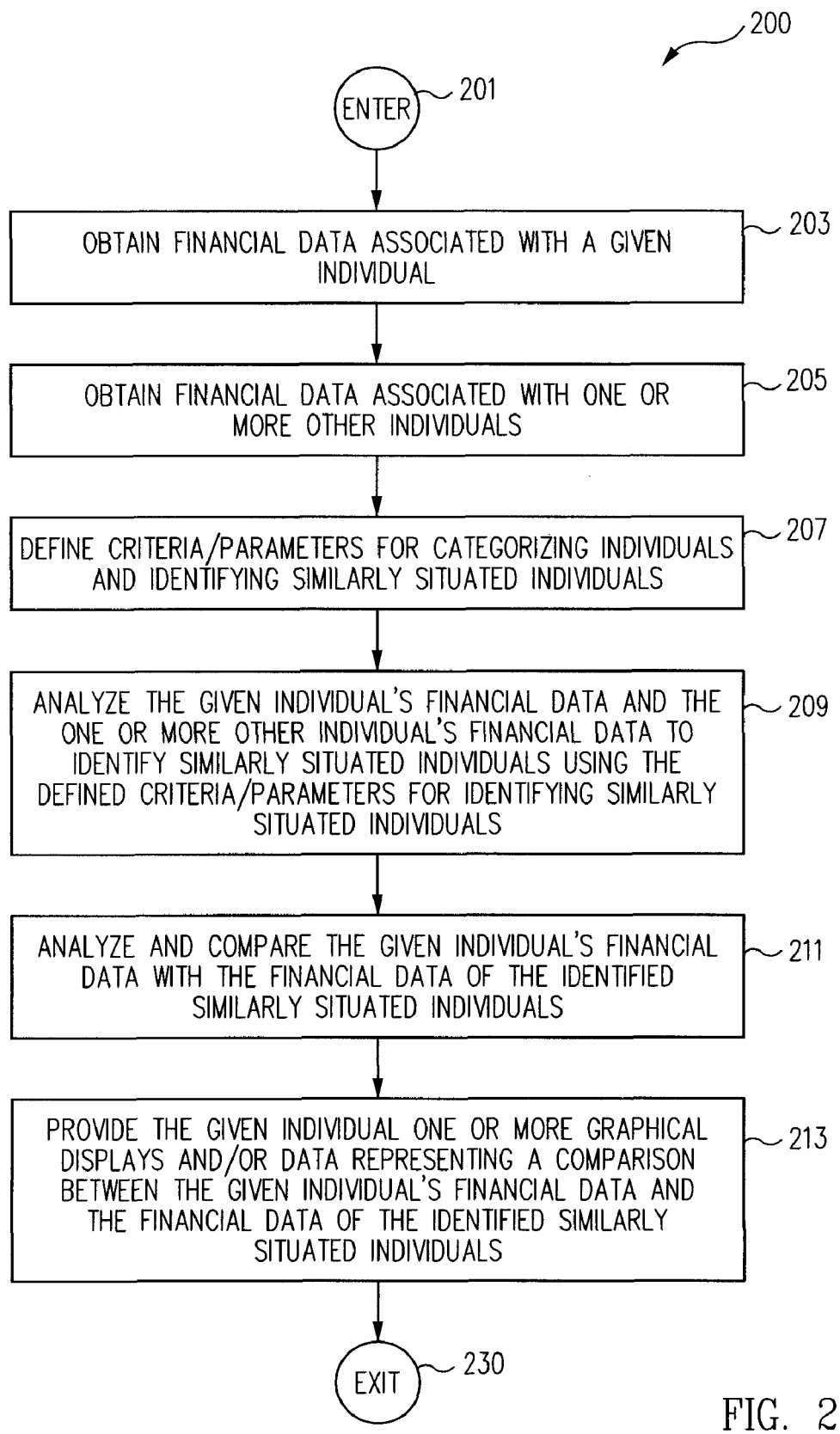
FIG. 2 is a flow chart depicting a process for providing relative financial position data in accordance with one embodiment.

FIG. 2 a flow chart depicting a process for providing relative financial position data 200 in accordance with one embodiment. Process for providing relative financial position data 200 begins at ENTER OPERATION 201 of FIG. 2 and process flow proceeds to OBTAIN FINANCIAL DATA ASSOCIATED WITH A GIVEN INDIVIDUAL OPERATION 203.

In one embodiment, at OBTAIN FINANCIAL DATA ASSOCIATED WITH A GIVEN INDIVIDUAL OPERATION 203 actual financial data associated with a given individual is obtained from one or more sources.

In one embodiment, the financial data associated with the with a given individual obtained at OBTAIN FINANCIAL DATA ASSOCIATED WITH A GIVEN INDIVIDUAL OPERATION 203 includes, but is not limited to: the individual's age; the individual's area of residence; the individual's marital status; the individual's dependents; the individual's occupation; the individual's income, and/or household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage payments; the individual's equity in real estate; the individual's stocks and other holdings; the individual's healthcare expenses; the individual's financial transaction data, including specific spending in defined categories and/or with specific merchants; and/or any other financial and/or demographic data desired/defined by the provider of process for providing relative financial position data 200 and/or a user of process for providing relative financial position data 200.

In one embodiment, access to at least part of the financial data associated with the given individual is obtained at OBTAIN FINANCIAL DATA ASSOCIATED WITH A GIVEN INDIVIDUAL OPERATION 203 through one or more computing system implemented financial management systems, such as computing system implemented financial management systems 180 and/or 190 of FIG. 1, and/or one or more computing system implemented data management systems, such as computing system implemented data management system 185, that implement, include, are accessible by, and/or are otherwise associated with, process for providing relative financial position data 200 (FIG. 2). In various embodiments, the one or more computing system implemented financial management systems, and/or one or more computing system implemented data management systems, can be any of the numerous computing system implemented financial management systems, and/or computing system implemented data management systems, as discussed herein, and/or known to those of skill in the art at the time of filing, and/or as developed after the time of filing.

Current computing system implemented financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain financial transaction information, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using computing system implemented financial management systems, the financial transaction information, payee identification, payee location, payment amount, date of the transaction, various tags and/or labels, and other data is often used by the computing system implemented financial management system to categorize and/or tag individual financial transactions as a particular type of income or expense, to generate various financial reports, and to create an overview of the individual's financial situation based on input from multiple, and often all, available sources of financial information regarding a given individual. Some currently offered computing system implemented financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, the financial data associated with the given individual is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH A GIVEN INDIVIDUAL OPERATION 203 from the user/given individual, a bank, credit card company, a credit reporting agency or bureau, and/or any other financial institution or data source via any network or network system, such as the Internet and/or as discussed herein, and/or available or known at the time of filing, and/or as later developed.

In one embodiment, the financial data associated with the given individual is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH A GIVEN INDIVIDUAL OPERATION 203, from the user/given individual, a bank, credit card company, a credit reporting agency or bureau, and/or any other financial institution or data source through a user interface device, such as a keyboards 115, 165, or 147 of FIG. 1, mice 111, 161, or 187, touchpad, voice recognition software, or any other device and/or system capable of providing user input to a computing system and/or for translating user actions into computing system operations, whether available or known at the time of filing or as developed later.

Returning to FIG. 2, in one embodiment, the financial data associated with the given individual is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH A GIVEN INDIVIDUAL OPERATION 203, from a database, such as database 170 of FIG. 1, maintained by the user/given individual, a bank, a credit card company, credit reporting agency or bureau, and/or any other financial institution or data source, as discussed herein, and/or available or known at the time of filing, and/or as later developed.

Returning to FIG. 2, in one embodiment, the financial data associated with the given individual is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH A GIVEN INDIVIDUAL OPERATION 203, from the user/given individual, a bank, credit card company, a credit reporting agency or bureau, and/or any other financial institution or data source by embedding the data in, or on, a computer program product, as defined herein, and providing the computer program product to the provider of computing system implemented financial management system associated with process for providing relative financial position data 200 and/or process for providing relative financial position data 200.

In one embodiment, access to at least part of the financial data associated with the given individual is obtained by process for providing relative financial position data 200, and/or a computing system implemented financial management system associated with process for providing relative financial position data 200, at OBTAIN FINANCIAL DATA ASSOCIATED WITH A GIVEN INDIVIDUAL OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, stocks, mutual funds, investment accounts, or other financial resources, accounts and/or services used by an individual to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by the given individual to pay for and/or conduct financial transactions.

In one embodiment, the financial data associated with the given individual is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH A GIVEN INDIVIDUAL OPERATION 203, from the user/given individual, a bank, credit card company, a credit reporting agency or bureau, and/or any other financial institution or data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once the financial data associated with the given individual is obtained from one or more sources at OBTAIN FINANCIAL DATA ASSOCIATED WITH A GIVEN INDIVIDUAL OPERATION 203, process flow proceeds to OBTAIN FINANCIAL DATA ASSOCIATED WITH ONE OR MORE OTHER INDIVIDUALS OPERATION 205.

In one embodiment at OBTAIN FINANCIAL DATA ASSOCIATED WITH ONE OR MORE OTHER INDIVIDUALS OPERATION 205 actual financial data associated with one or more individuals other than the given individual of OBTAIN FINANCIAL DATA ASSOCIATED WITH A GIVEN INDIVIDUAL OPERATION 203 is obtained from one or more sources.

In one embodiment, the financial data associated with the with the one or more other individuals obtained at OBTAIN FINANCIAL DATA ASSOCIATED WITH ONE OR MORE OTHER INDIVIDUALS OPERATION 205 includes, but is not limited to: the individual's age; the individual's area of residence; the individual's marital status; the individual's dependents; the individual's occupation; the individual's income, and/or household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage payments; the individual's equity in real estate; the individual's stocks and other holdings; the individual's healthcare expenses; the individual's financial transaction data, including specific spending in defined categories and/or with specific merchants; and/or any other financial and/or demographic data desired/defined by the provider of process for providing relative financial position data 200 and/or a user of process for providing relative financial position data 200.

In one embodiment, at least part of the financial data associated with the one or more other individuals is obtained at OBTAIN FINANCIAL DATA ASSOCIATED WITH ONE OR MORE OTHER INDIVIDUALS OPERATION 205 through one or more computing system implemented financial management systems, such as computing system implemented financial management systems 180 and/or 190 of FIG. 1, and/or one or more computing system implemented data management systems, such as computing system implemented data management system 185, that implement, include, are accessible by, and/or are otherwise associated with process for providing relative financial position data 200 (FIG. 2). In various embodiments, the one or more computing system implemented financial management systems, and/or one or more computing system implemented data management systems, can be any of the numerous computing system implemented financial management systems, and/or computing system implemented data management systems, as discussed herein, and/or known to those of skill in the art at the time of filing, and/or as developed after the time of filing.

In one embodiment, at least part of the financial data associated with the one or more other individuals is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH ONE OR MORE OTHER INDIVIDUALS OPERATION 205 from the user/individuals, a bank, credit card company, a credit reporting agency or bureau, and/or any other financial institution or data source via any network or network system, as discussed herein, and/or available or known at the time of filing, and/or as later developed.

In one embodiment, at least part of the financial data associated with the one or more other individuals is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH ONE OR MORE OTHER INDIVIDUALS OPERATION 205 from the user/individuals, a bank, credit card company, a credit reporting agency or bureau, and/or any other financial institution or data source through a user interface device, such as a keyboards 115, 165, or 147 of FIG. 1, mice 111, 161, or 187, touchpad, voice recognition software, or any other device and/or system capable of providing user input to a computing system and/or for translating user actions into computing system operations, whether available or known at the time of filing or as developed later.

Returning to FIG. 2, in one embodiment, at least part of the financial data associated with the one or more other individuals is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH ONE OR MORE OTHER INDIVIDUALS OPERATION 205 from a database, such as database 170 of FIG. 1, maintained by the user/individuals, a bank, a credit card company, credit reporting agency or bureau, and/or any other financial institution or data source, as discussed herein, and/or available or known at the time of filing, and/or as later developed.

Returning to FIG. 2, in one embodiment, at least part of the financial data associated with the one or more other individuals is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH ONE OR MORE OTHER INDIVIDUALS OPERATION 205 from the user/individuals, a bank, credit card company, a credit reporting agency or bureau, and/or any other financial institution or data source by embedding the data in, or on, a computer program product, as defined herein, and providing the computer program product to the provider of the computing system implemented financial management system associated with process for providing relative financial position data 200 and/or process for providing relative financial position data 200.

In one embodiment, at least part of the financial data associated with the one or more other individuals is obtained by process for providing relative financial position data 200, and/or a computing system implemented financial management system associated with process for providing relative financial position data 200, at OBTAIN FINANCIAL DATA ASSOCIATED WITH ONE OR MORE OTHER INDIVIDUALS OPERATION 205 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, stocks, mutual funds, investment accounts, or other financial resources, accounts and/or services used by an individual to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by the given individual to pay for and/or conduct financial transactions.

In one embodiment, at least part of the financial data associated with the one or more other individuals is provided to, and/or entered into, and/or transferred to, and/or downloaded to, and/or otherwise obtained by, process for providing relative financial position data 200, and/or a computing system implemented financial management system associated with process for providing relative financial position data 200, at OBTAIN FINANCIAL DATA ASSOCIATED WITH ONE OR MORE OTHER INDIVIDUALS OPERATION 205 from the user/individuals, a bank, credit card company, a credit reporting agency or bureau, and/or any other financial institution or data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once actual financial data associated with one or more individuals other than the given individual of OBTAIN FINANCIAL DATA ASSOCIATED WITH A GIVEN INDIVIDUAL OPERATION 203 is obtained from one or more sources at OBTAIN FINANCIAL DATA ASSOCIATED WITH ONE OR MORE OTHER INDIVIDUALS OPERATION 205, process flow proceeds to DEFINE CRITERIA/PARAMETERS FOR CATEGORIZING INDIVIDUALS AND IDENTIFYING SIMILARLY SITUATED INDIVIDUALS OPERATION 207.

In one embodiment, at DEFINE CRITERIA/PARAMETERS FOR CATEGORIZING INDIVIDUALS AND IDENTIFYING SIMILARLY SITUATED INDIVIDUALS OPERATION 207 one or more financial categorization criteria/parameters are defined and/or the given individual's financial data of OBTAIN FINANCIAL DATA ASSOCIATED WITH A GIVEN INDIVIDUAL OPERATION 203 and/or the one or more other individuals' financial data of OBTAIN FINANCIAL DATA ASSOCIATED WITH ONE OR MORE OTHER INDIVIDUALS OPERATION 205 is analyzed and/or processed by process for providing relative financial position data 200 to categorize individuals into categories and/or groupings based on the one or more defined financial categorization criteria/parameters.

In one embodiment, the one or more financial categorization criteria/parameters of DEFINE CRITERIA/PARAMETERS FOR CATEGORIZING INDIVIDUALS AND IDENTIFYING SIMILARLY SITUATED INDIVIDUALS OPERATION 207 include, but are not limited to one or more of the following: age; area of residence; marital status; dependents; occupation; income; average contributions to saving accounts and/or programs over a given time; savings account balances; average contributions to retirement accounts and/or programs over a given time; balances in retirement accounts and/or programs; average balances in checking; mortgage payments; equity in real estate; stocks and other holdings; healthcare expenses; financial transaction data, including specific spending in defined categories and/or with specific merchants; and/or any other financial and/or demographic data desired/defined by the provider of process for providing relative financial position data 200 and/or a user/individual using process for providing relative financial position data 200.

In one embodiment, the one or more defined financial categorization criteria/parameters used to categorize the given individual of OBTAIN FINANCIAL DATA ASSOCIATED WITH A GIVEN INDIVIDUAL OPERATION 203 and/or the one or more other individuals' of OBTAIN FINANCIAL DATA ASSOCIATED WITH ONE OR MORE OTHER. INDIVIDUALS OPERATION 205 to be used are defined by the provider of process for providing relative financial position data 200, and/or the given individual of OBTAIN FINANCIAL DATA ASSOCIATED WITH A GIVEN INDIVIDUAL OPERATION 203, and/or a user of process for providing relative financial position data 200.

In one embodiment, all, or part, of the data of OBTAIN FINANCIAL DATA ASSOCIATED WITH A GIVEN INDIVIDUAL OPERATION 203, the data of OBTAIN FINANCIAL DATA ASSOCIATED WITH ONE OR MORE OTHER INDIVIDUALS OPERATION 205, and/or the data representing the one or more defined financial categorization criteria/parameters of DEFINE CRITERIA/PARAMETERS FOR CATEGORIZING INDIVIDUALS AND IDENTIFYING SIMILARLY SITUATED INDIVIDUALS OPERATION 207 is stored in whole, or in part, in a data storage means maintained by, accessible by, owned by, or otherwise related to: process for providing relative financial position data 200 (FIG. 2), and/or a provider of process for providing relative financial position data 200; a computing system implemented financial management system, and/or a provider of a computing system implemented financial management system; a computing system implemented data management system, and/or a provider of a computing system implemented data management system, or any other party, by any one of the numerous mechanisms known to those of skill in the art. For instance, in one embodiment, the data, in whole, or in part, is stored in a memory system, such as memory systems 103, 143, 153 or server memory system 123, or database 170, of FIG. 1, or in a cache memory, such as cache memories 103A/153A/143A of FIG. 1, or in any main memory or mass memory, associated with a computing system, such as computing systems 100, 140, or 150 described above. In one embodiment, the data, in whole, or in part, is stored in any computing system and/or server system, such as computing systems 100, 140, or 150 or server system 120, or other device, in another location, or on/in a computer readable medium, and/or any other computer program product, as defined herein. In one embodiment, the data, in whole, or in part, is stored on a webpage, in a web-based system, or on a public network such as the Internet.

Returning to FIG. 2, in some embodiments, the data stored as described above is maintained, in whole, or in part, by: process for providing relative financial position data 200, and/or a provider of process for providing relative financial position data 200; a computing system implemented financial management system, and/or a provider of a computing system implemented financial management system; a computing system implemented data management system, and/or a provider of a computing system implemented data management system; a third party data storage institution; any third party service or institution; or any other parties. In these embodiments, access to the data is then provided to process for providing relative financial position data 200, and/or a computing system implemented financial management system, by providing access to the data and/or providing the data on a computer program product.

In one embodiment, once one or more financial categorization criteria/parameters are defined at DEFINE CRITERIA/PARAMETERS FOR CATEGORIZING INDIVIDUALS AND IDENTIFYING SIMILARLY SITUATED INDIVIDUALS OPERATION 207, process flow proceeds to ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209.

In one embodiment, at ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209 the given individual's financial data of OBTAIN FINANCIAL DATA ASSOCIATED WITH A GIVEN INDIVIDUAL OPERATION 203 and/or the one or more other individuals' financial data of OBTAIN FINANCIAL DATA ASSOCIATED WITH ONE OR MORE OTHER INDIVIDUALS OPERATION 205 is analyzed and/or processed by process for providing relative financial position data 200 to identify one or more individuals of the one or more one or more other individuals' of OBTAIN FINANCIAL DATA ASSOCIATED WITH ONE OR MORE OTHER INDIVIDUALS OPERATION 205 that are similar situated to the given individual of OBTAIN FINANCIAL DATA ASSOCIATED WITH A GIVEN INDIVIDUAL OPERATION 203 based on the one or more defined financial categorization criteria/parameters of DEFINE CRITERIA/PARAMETERS FOR CATEGORIZING INDIVIDUALS AND IDENTIFYING SIMILARLY SITUATED INDIVIDUALS OPERATION 207.

As discussed above, in one embodiment, the given individual's financial data of OBTAIN FINANCIAL DATA ASSOCIATED WITH A GIVEN INDIVIDUAL OPERATION 203 and/or the one or more other individuals' financial data of OBTAIN FINANCIAL DATA ASSOCIATED WITH ONE OR MORE OTHER INDIVIDUALS OPERATION 205 is obtained using a computing system implemented financial management system, such as computing system implemented financial management systems 180 and/or 190 of FIG. 1, and/or a computing system implemented data management system, such as computing system implemented data management system 185.

As also noted above, using computing system implemented financial management systems, the financial transaction data, payee identification, payee location, payment amount, date of the transaction, tags, flags, and other data is often used by the computing system implemented financial management system to categorize and/or tag and/or flag individual financial transactions as a particular type of income or expense.

In these instances at ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209 the individual's financial data of OBTAIN FINANCIAL. DATA ASSOCIATED WITH A GIVEN INDIVIDUAL OPERATION 203, and the one or more other individuals' financial data of OBTAIN ONE OR MORE OTHER INDIVIDUALS' FINANCIAL DATA OPERATION 205, as categorized flagged, and/or tagged by, or through, one or more computing system implemented financial management systems, is used by process for providing relative financial position data 200 to identify common attributes based, at least in part, on the one or more financial categorization criteria/parameters for defining/identifying similarly situated individuals of DEFINE FINANCIAL CATEGORIZATION CRITERIA/PARAMETERS FOR IDENTIFYING SIMILARLY SITUATED INDIVIDUALS OPERATION 207.

In these instances, at ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209 relatively detailed analysis is possible because, as discussed above, using computing system implemented financial management systems, the financial transaction data, payee identification, payee location, payment amount, date of the transaction, item purchased identification data, tags, flags, and other data is often used by the computing system implemented financial management system to categorize and/or tag and/or flag individual financial transactions as a particular type of income or expense. In addition, as discussed above, computing system implemented financial management systems typically have access to data from multiple sources, and often all sources, so that a relatively complete set of financial data can be obtained, used for categorization, and/or compared.

In one embodiment, once the given individual's financial data of OBTAIN FINANCIAL DATA ASSOCIATED WITH A GIVEN INDIVIDUAL OPERATION 203 and/or the one or more other individuals' financial data of OBTAIN FINANCIAL DATA ASSOCIATED WITH ONE OR MORE OTHER INDIVIDUALS OPERATION 205 is analyzed and/or processed by process for providing relative financial position data 200 to identify one or more individuals of the one or more one or more other individuals' of OBTAIN FINANCIAL DATA ASSOCIATED WITH ONE OR MORE OTHER INDIVIDUALS OPERATION 205 that are similar situated to the given individual of OBTAIN FINANCIAL DATA ASSOCIATED WITH A GIVEN INDIVIDUAL OPERATION 203 based on the one or more defined financial categorization criteria/parameters of DEFINE CRITERIA/PARAMETERS FOR CATEGORIZING INDIVIDUALS AND IDENTIFYING SIMILARLY SITUATED INDIVIDUALS OPERATION 207 at ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209, process flow proceeds to ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213.

In one embodiment, at ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213 the given individual's financial data of OBTAIN FINANCIAL DATA ASSOCIATED WITH A GIVEN INDIVIDUAL OPERATION 203 is compared with the financial data of OBTAIN FINANCIAL DATA ASSOCIATED WITH ONE OR MORE OTHER INDIVIDUALS OPERATION 205 associated with the identified similarly situated other individuals of ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209.

In one embodiment, at ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213 the given individual's financial data of OBTAIN FINANCIAL DATA ASSOCIATED WITH A GIVEN INDIVIDUAL OPERATION 203 is compared with the financial data of OBTAIN FINANCIAL DATA ASSOCIATED WITH ONE OR MORE OTHER INDIVIDUALS OPERATION 205 associated with the similarly situated other individuals of ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209 in various defined and/or desired categories, including, but not limited to: age; area of residence; occupation; income; average contributions to saving accounts and/or programs over a given time; savings account balances; average contributions to retirement accounts and/or programs over a given time; balances in retirement accounts and/or programs; average balances in checking accounts; mortgage payments; equity in real estate; stocks and other holdings; healthcare expenses; financial transaction data, including specific spending in defined categories and/or with specific merchants; and/or any other financial and/or demographic data desired/defined by the provider of process for providing relative financial position data 200 and/or a user of process for providing relative financial position data 200.

In one embodiment, relatively detailed comparisons are possible at ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213 because, as discussed above, in embodiments using computing system implemented financial management systems, the financial transaction data, payee identification, payee location, payment amount, date of the transaction, item purchased identification data, tags, flags, and other data is often used/created by the computing system implemented financial management system to categorize and/or tag and/or flag individual financial transactions as a particular type of income or expense. In addition, as discussed above, computing system implemented financial management systems typically have access to data from multiple sources, and often all sources, so that a relatively complete set of financial data can be obtained and compared.

The specific analysis, financial categorization criteria/parameters, comparison criteria, and examples discussed above, are but a few specific examples of possible ways that at DEFINE CRITERIA/PARAMETERS FOR CATEGORIZING INDIVIDUALS AND IDENTIFYING SIMILARLY SITUATED INDIVIDUALS OPERATION 207, ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211 and ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213 the individuals' financial data obtained at OBTAIN FINANCIAL DATA ASSOCIATED WITH A GIVEN INDIVIDUAL OPERATION 203 and OBTAIN ONE OR MORE OTHER INDIVIDUALS' FINANCIAL DATA OPERATION 205 is analyzed and/or compared. In other embodiments, any other analysis and/or financial categorization criteria/parameters, or combination of data and/or financial categorization criteria/parameters, and comparison criteria, considered desirable by the provider of process for providing relative financial position data 200, and/or the provider and/or a computing system implemented financial management system associated with process for providing relative financial position data 200, can be defined and/or used. Consequently, the specific examples discussed above are illustrative only and do not limit the invention as claimed below.

In one embodiment, once the given individual's financial data of OBTAIN FINANCIAL DATA ASSOCIATED WITH A GIVEN INDIVIDUAL OPERATION 203 is compared with the financial data of OBTAIN FINANCIAL DATA ASSOCIATED WITH ONE OR MORE OTHER INDIVIDUALS OPERATION 205 associated with the identified similarly situated other individuals of ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 209 at ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213, process flow proceeds to PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays and/or data displays based, at least in part, on the comparison data of ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays and/or data displays showing a comparison between the individual's own financial position and the average financial position of the identified similarly situated individuals of ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211 in the form of any symbol or graphical display capable of visually showing the individual's own financial position relative to the average financial position of the identified similarly situated individuals.

As an example, in various embodiments, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays such as, but not limited to: a thermometer; a sliding scale; any graphical representation, and/or any partially filled figure or symbol, or outline thereof. Moreover, these graphical displays, in some embodiments, display either the individual's own financial position relative to the average financial position of the identified similarly situated individuals or the differential between the individual's own financial position relative to the average financial position of the identified similarly situated individuals.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays and/or data displays showing a comparison between the individual's own financial position and the average financial position of the identified similarly situated individuals of ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211 in the form of a report and/or summary statement.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided an alert containing data regarding the individual's own financial position and the average financial position of the identified similarly situated individuals.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215, the given individual of OBTAIN FINANCIAL DATA ASSOCIATED WITH A GIVEN INDIVIDUAL OPERATION 203 is provided one or more graphical displays, and/or alerts, on any display, such as display devices 115, 165, 189, 125 of FIG. 1, accessible by the individual and/or any authorized user, such as discussed herein, and/or known in the art at the time of filing, and/or as developed after the time of filing. In one embodiment, the display device is associated with any computing system discussed herein, and/or known in the art at the time of filing, and/or as developed after the time of filing, such as computing systems 100, 140 and/or 150 and/or server system 120.

Returning to FIG. 2, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays and/or data displays and/or alerts by providing the given individual, or any authorized user, access to one or more websites.

Returning to FIG. 2, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays and/or data displays and/or alerts by providing the given individual, or any authorized user, access to any database, computing system, and/or a server system, or any web-site or other web-based system, as discussed herein, and/or as known in the art at the time of filing, and/or as developed after the time of filing, that is associated with process for providing relative financial position data 200.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual, or any authorized user, is provided one or more graphical displays and/or data displays and/or alerts via a computer program product as discussed herein.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual, or any authorized user, is provided one or more graphical displays and/or data displays and/or alerts through, and/or from, a computing system implemented financial management system, such as computing system implemented financial management systems 180 and/or 190 of FIG. 1, that is a parent system for, implements, and/or is otherwise associated with, process for providing relative financial position data 200.

Returning to FIG. 2, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual, or any authorized user, is provided one or more graphical displays and/or data displays and/or alerts through, and/or from, a computing system implemented data management system, such as computing system implemented data management system 185 of FIG. 1, that is a parent system for, implements, and/or is otherwise associated with, process for providing relative financial position data 200.

Returning to FIG. 2, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual, or any authorized user, is provided one or more graphical displays and/or data displays and/or alerts through any network of computing systems and/or server systems, such as network 130 of FIG. 1, that is comprised of multiple different computers, wireless devices, cellular telephones, digital telephones, two-way pagers, personal digital assistants, server computers, or any desired combination.

Returning to FIG. 2, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual, or any authorized user, is provided one or more graphical displays and/or data displays and/or alerts through e-mail or through text messaging.

Returning to FIG. 2, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual, or any authorized user, is provided one or more graphical displays and/or data displays and/or alerts using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions, and/or any systems, whether known at the time of filing or as thereafter developed.

As noted above, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided one or more graphical displays and/or data displays showing a comparison between the individual's own financial position and the average financial position of the identified similarly situated individuals of ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211 in the form of a graphical display capable of visually showing the individual's own financial position relative to the average financial position of the identified similarly situated individuals.

Figure 3:
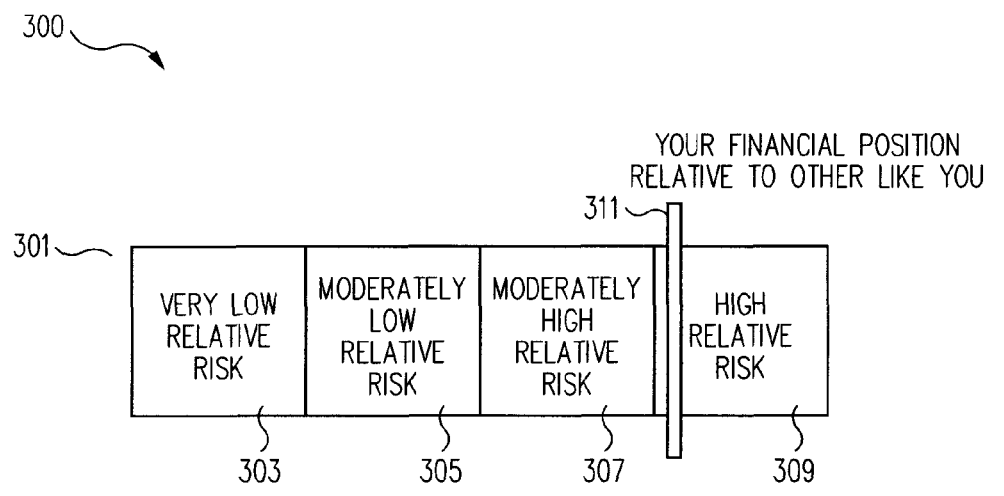
FIG. 3 is a graphical display showing a comparison between an individual's own financial position and the average financial position of the identified similarly situated individuals in accordance with one embodiment.

FIG. 3 is a graphical display 300 showing a comparison between an individual's own financial risk position and the average financial risk position of identified similarly situated individuals, such as would be displayed on a display device at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA WITH THE FINANCIAL DATA OF THE IDENTIFIED SIMILARLY SITUATED INDIVIDUALS OPERATION 215, in accordance with one embodiment.

Returning to FIG. 3, graphical display 300 includes relative financial risk sliding scale 301; given individual comparison marker 311; explanation section 321; details activation box 327; and advice activation box 331.

In this specific example, relative financial risk sliding scale 301 includes relative financial risk sections 303, 305, 307 and 309 showing: "VERY LOW RELATIVE RISK" (303); "MODERATELY LOW RELATIVE RISK" (305); "MODERATELY HIGH RELATIVE RISK" (307); and "HIGH RELATIVE RISK" (309). In this specific example, the levels of risk associated with relative financial risk sections 303, 305, 307 and 309, and relative financial risk sliding scale 301, have been calculated based on averaged financial data from one or more other individuals, such as would be obtained at OBTAIN FINANCIAL DATA ASSOCIATED WITH ONE OR MORE OTHER INDIVIDUALS OPERATION 205 (FIG. 2) that are determined to be similarly situated to a given individual using analysis such as would be performed at the analysis ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211.

Returning to FIG. 3, in this specific example, relative financial risk sliding scale 301 includes given individual comparison marker 311. In this specific example, given individual comparison marker 311 indicates the relative financial risk associated with a given individual, such as an individual of OBTAIN FINANCIAL DATA ASSOCIATED WITH A GIVEN INDIVIDUAL OPERATION 203 (FIG. 2), to the average of the financial data associated with the one or more other individuals, such as would be obtained at OBTAIN FINANCIAL DATA ASSOCIATED WITH ONE OR MORE OTHER INDIVIDUALS OPERATION 205 (FIG. 2), that are determined to be similarly situated to a given individual using analysis such as would be performed at the analysis ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211. Returning to FIG. 3, in this specific example, the given individual is shown to be at the low end of relative financial risk section 309 on relative financial risk sliding scale 301. Consequently, in this specific example, the given individual is shown to be at "HIGH RELATIVE RISK" compared to similarly situated individuals.

Returning to FIG. 3, in this specific example, graphical display 300 also includes explanation section 321. In this example, explanation section 321 provides summarized report data explaining the main reasons for the placement of given individual comparison marker 311 and why, in this specific example, the given individual is shown to be at "HIGH RELATIVE RISK" compared similarly situated individuals.

Returning to FIG. 3, in this specific example, graphical display 300 also includes details activation box 327 which the user can activate to view further data and details regarding the placement of given individual comparison marker 311 and why, in this specific example, the given individual is shown to be at "HIGH RELATIVE RISK" compared similarly situated individuals.

Returning to FIG. 3, in this specific example, graphical display 300 also includes advice activation box 331 which the user can activate to view, in one embodiment, data representing advice regarding any recommended changes and/or allocation of funds the individual might wish to make in order to better align the individual's own financial position with the average financial position of the identified similarly situated individuals.

As noted above, in one embodiment, at PROVIDE THE GIVEN INDIVIDUAL ONE OR MORE GRAPHICAL DIS- PLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is provided an alert containing data regarding the individual's own financial position and the average financial position of the identified similarly situated individuals.

Figure 4:
FIG. 4 is an example of an alert as would be sent to an individual in accordance with one embodiment.

FIG. 4 is an example of a relative financial position alert 400, as would be sent to an individual in accordance with one embodiment at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA WITH THE FINANCIAL DATA OF THE IDENTIFIED SIMILARLY SITUATED INDIVIDUALS OPERATION 215 (FIG. 2).

Returning to FIG. 4, in this specific example, financial position alert 400 includes unsecured debt alert 401; mortgage payment alert 403; and details activation box 405, which the user can activate to view further data and details regarding unsecured debt alert 401 and mortgage payment alert 403.

Those of skill in the art will readily recognize that the specific displays shown in FIG. 3 and FIG. 4 are exemplary only. In particular, the display screens and user interface elements shown in FIG. 3 and FIG. 4 are in accordance with one illustrative example and other layouts, arrangements, formats, and user interface features may be provided without departing from the characteristics of the invention as set forth in the claims.

In one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA WITH THE FINANCIAL DATA OF THE IDENTIFIED SIMILARLY SITUATED INDIVIDUALS OPERATION 215 the given individual of OBTAIN FINANCIAL DATA ASSOCIATED WITH A GIVEN INDIVIDUAL OPERATION 203 is also provided access to data representing advice regarding any recommended changes and/or allocation of funds the individual might wish to make in order to better align him/her self with the average financial and spending activities of the similarly situated individuals identified at ANALYZE THE GIVEN INDIVIDUAL'S FINANCIAL DATA AND THE ONE OR MORE OTHER INDIVIDUALS' FINANCIAL DATA TO IDENTIFY SIMILARLY SITUATED INDIVIDUALS USING THE DEFINED CRITERIA/PARAMETERS FOR IDENTIFYING SIMILARLY SITUATED INDIVIDUALS OPERATION 211.

For instance, as a specific example, assume a given individual spends an average of $10,000.00 a year golfing while similarly situated individuals spend only an average of $4,000.00. In addition, assume that the given individual makes no contribution to his or her 401K/retirement plan, while similarly situated individuals contribute $5,000.00 a year to their 401K/retirement plan. Under these specific circumstances, in one embodiment, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA WITH THE FINANCIAL DATA OF THE IDENTIFIED SIMILARLY SITUATED INDIVIDUALS OPERATION 215 the given individual may be advised to cut golf back to $5,000.00 a year and to contribute $5,000.00 a year to his or her 401K/retirement plan.

In addition, in one embodiment, the given individual is provided financial analysis of the expected results of the given individual taking the advised action at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA WITH THE FINANCIAL DATA OF THE IDENTIFIED SIMILARLY SITUATED INDIVIDUALS OPERATION 215.

For instance, continuing with the specific example discussed above, at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA WITH THE FINANCIAL DATA OF THE IDENTIFIED SIMILARLY SITUATED INDIVIDUALS OPERATION 215 the given individual may be advised to cut golf back to $5,000.00 a year and to contribute $5,000.00 a year to his or her 401K/retirement plan and, in addition, the given individual may be informed that the result of this action would be $200,000.00 additional retirement funds being available at age 65.

In one embodiment, once the given individual of OBTAIN FINANCIAL DATA ASSOCIATED WITH A GIVEN INDIVIDUAL OPERATION 203 is provided one or more graphical displays and/or data displays based, at least in part, on the comparison data of ANALYZE AND COMPARE THE GIVEN INDIVIDUAL'S FINANCIAL DATA WITH THE FINANCIAL DATA OF THE IDENTIFIED SIMILARLY SITUATED INDIVIDUALS OPERATION 213 at PROVIDE THE GIVEN INDIVIDUAL ONE OR MORE GRAPHICAL DISPLAYS AND/OR DATA REPRESENTING A COMPARISON BETWEEN THE GIVEN INDIVIDUAL'S FINANCIAL DATA AND THE FINANCIAL DATA OF THE IDENTIFIED SIMILARLY SITUATED INDIVIDUALS OPERATION 215, process flow proceeds to EXIT OPERATION 230. In one embodiment, at EXIT OPERATION 230, process for providing relative financial position data 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing relative financial position data 200, an individual's actual financial data is used to provide the individual with a specific comparison between the individual's actual financial position and/or activity and the financial position and/or activity of similarly situated individuals based on the actual financial data of the similarly situated individuals.

Consequently, using process for providing relative financial position data 200, individuals can benefit from comparative analysis and the "wisdom of the masses" potentially available with the advent of the Internet, improved processing power, and improved data storage.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "aggregating", "analyzing", "defining", "storing", "saving", "displaying", "categorizing", "providing", "processing", "accessing", "selecting" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer program product for providing relative financial position data comprising:
    a nontransitory computer readable medium;
    and computer program code, encoded on the computer readable medium, comprising computer readable instructions which, when executed on a processor, perform a process for:
    obtaining a first individual's financial data, the first individual's financial data being associated with the first individual and including actual financial transactions associated with the first individual;
    obtaining one or more other individuals' financial data, the one or more other individuals being individuals other than the first individual, the one or more other individuals' financial data being associated with the one or more other individuals and including actual financial transactions associated with the one or more other individuals;
    defining one or more financial categorization criteria/parameters to identify similarly situated individuals, the similarly situated individuals having attributes in common with the first individual that are identified, at least in part, using the one or more financial categorization criteria/parameters;
    analyzing the one or more other individuals' financial data to identify one or more similarly situated individuals of the one or more other individuals, the similarly situated individuals being identified based, at least in part, on the one or more financial categorization criteria/parameters;

comparing at least part of the first individual's financial data with at least part of the financial data associated with the one or more similarly situated individuals, the compared part of the first individuals financial data at least including the actual financial transactions of the first individual, the compared part of the similarly situated individuals financial data at least including the actual financial transactions of the similarly situated individuals;

generating a graphical display, the graphical display being based, at least in part, on the comparison of at least part of the first individual's financial data with at least part of the financial data associated with the one or more similarly situated individuals, the graphical display indicating the first individual's financial position relative to the one or more similarly situated individuals;

providing the first individual with the graphical display indicating the first individual's financial position relative to the one or more similarly situated individuals; and providing advice to the first individual regarding specific changes to make in order to align that first individual with the financial data associated with the one or more similarly situated individuals, the advice being based, at least in part, on the comparison of the financial transactions of the individual with the financial transactions of the similarly situated individuals.

2. The computer program product for providing relative financial position data of claim 1, wherein;
at least part of the first individual's financial data is obtained from a computing system implemented financial management system.

3. The computer program product for providing relative financial position data of claim 1, wherein;
at least part of the first individual's financial data is obtained from a computing system implemented personal financial management system.

4. The computer program product for providing relative financial position data of claim 1, wherein;
at least part of the first individual's financial data is obtained from at least two or more of the following sources:
a bank;
a debit card account;
a credit union; or
a credit card account.

5. The computer program product for providing relative financial position data of claim 1, wherein;
at least part of the individual's financial data includes financial data selected from the group of financial data consisting of:
the individual's age;
the individual's marital status;
the individual's number of dependents;
the individual's area of residence;
the individual's occupation;
the individual's income;
the individual's average contributions to saving accounts and/or programs over a given time;
the individual's savings account balances;
the individual's average contributions to retirement accounts and/or programs over a given time;
the individual's balances in retirement accounts and/or programs;
the individual's average balances in checking accounts;
the individual's mortgage balances;
the individual's credit card debt;
the individual's unsecured debt;
the individual's mortgage payments;
the individual's equity in real estate;
the individual's stocks and other holdings;
the individual's healthcare expenses;
the individuals spending in defined categories; and
the individuals spending with defined merchants.

6. The computer program product for providing relative financial position data of claim 1, wherein;
at least part of the one or more other individuals' financial data is obtained from a computing system implemented financial management system.

7. The computer program product for providing relative financial position data of claim 1, wherein;
at least part of the one or more other individuals' financial data is obtained from a computing system implemented personal financial management system.

8. The computer program product for providing relative financial position data of claim 1, wherein;
at least part of the one or more other individuals' financial data is obtained from at least two or more of the following sources:
a bank;
a debit card account;
a credit union; or
a credit card account.

9. The computer program product for providing relative financial position data of claim 1, wherein;
at least part of the one or more other individual's financial data includes financial data selected from the group of financial data consisting of:
the individual's age;
the individual's marital status;
the individual's number of dependents;
the individual's area of residence;
the individual's occupation;
the individual's income;
the individual's average contributions to saving accounts and/or programs over a given time;
the individual's savings account balances;
the individual's average contributions to retirement accounts and/or programs over a given time;
the individual's balances in retirement accounts and/or programs;
the individual's average balances in checking accounts;
the individual's mortgage balances;
the individual's credit card debt;
the individual's unsecured debt;
the individual's mortgage payments;
the individual's equity in real estate;
the individual's stocks and other holdings;
the individual's healthcare expenses;
the individuals spending in defined categories; and
the individuals spending with defined merchants.

10. The computer program product for providing relative financial position data of claim 1, wherein;
at least one of the one or more financial categorization criteria/parameters defined to identify similarly situated individuals includes a financial categorization criterion/parameter selected from the group of financial categorization criteria/parameters consisting of:
age;
marital status;
number of dependents;
area of residence;
occupation;
income;

average contributions to saving accounts and/or programs over a given time;
savings account balances;
average contributions to retirement accounts and/or programs over a given time;
balances in retirement accounts and/or programs;
average balances in checking accounts;
mortgage balances;
mortgage payment;
credit card debt;
unsecured debt;
equity in real estate;
stocks and other holdings;
healthcare expenses;
spending in defined categories; and
spending with defined merchants.

11. The computer program product for providing relative financial position data of claim 1, wherein;
the at least part of the first individual's financial data is compared with at least part of the financial data associated with the one or more similarly situated individuals in at least one financial selected form the group of financial categories consisting of:
income;
average contributions to saving accounts and/or programs over a given time;
savings account balances;
average contributions to retirement accounts and/or programs over a given time;
balances in retirement accounts and/or programs;
balances in checking accounts;
mortgage payments;
mortgage balances;
credit card debt;
unsecured debt;
equity in real estate;
stocks and other holdings;
healthcare expenses;
spending in defined categories; and
spending with defined merchants.

12. The computer program product for providing relative financial position data of claim 1, wherein;
the graphical display indicating the first individual's financial position relative to the one or more similarly situated individuals is a graphical display selected for the group of graphical display consisting of:
a thermometer;
a sliding scale;
any figure or symbol
a partially filled figure or symbol;
an outline of a figure or symbol;
a partially filled outline of a figure or symbol;
a graphical caricature of a person or thing; and
an avatar.

13. A system for providing relative financial position data comprising:
a computing system; and
a processor; and
a memory coupled to the processor, the memory having stored therein processor executable instructions which when executed by the processor perform a process for providing relative financial position data, the process for providing relative financial position data comprising:
obtaining a first individual's financial data, the first individual's financial data being associated with the first individual and including actual financial transactions associated with the first individual;
obtaining one or more other individuals' financial data, the one or more other individuals being individuals other than the first individual, the one or more other individuals' financial data being associated with the one or more other individuals and including actual financial transactions associated with the one or more other individuals;
defining one or more financial categorization criteria/parameters to identify similarly situated individuals, the similarly situated individuals having attributes in common with the first individual that are identified, at least in part, using the one or more financial categorization criteria/parameters;
analyzing the one or more other individuals' financial data to identify one or more similarly situated individuals of the one or more other individuals, the similarly situated individuals being identified based, at least in part, on the one or more financial categorization criteria/parameters;
comparing at least part of the first individual's financial data with at least part of the financial data associated with the one or more similarly situated individuals, the compared part of the first individuals financial data at least including the actual financial transactions of the first individual, the compared part of the similarly situated individuals financial data at least including the actual financial transactions of the similarly situated individuals;
generating a graphical display, the graphical display being based, at least in part, on the comparison of at least part of the first individual's financial data with at least part of the financial data associated with the one or more similarly situated individuals, the graphical display indicating the first individual's financial position relative to the one or more similarly situated individuals;
providing the first individual with the graphical display indicating the first individual's financial position relative to the one or more similarly situated individuals; and
providing advice to the first individual regarding specific changes to make in order to align that first individual with the financial data associated with the one or more similarly situated individuals, the advice being based, at least in part, on the comparison of the financial transactions of the individual with the financial transactions of the similarly situated individuals.

14. The system for providing relative financial position data of claim 13, wherein;
at least part of the first individual's financial data is obtained from a computing system implemented financial management system.

15. The system for providing relative financial position data of claim 13, wherein;
at least part of the first individual's financial data is obtained from a computing system implemented personal financial management system.

16. The system for providing relative financial position data of claim 13, wherein;
at least part of the first individual's financial data is obtained from at least two or more of the following sources:
a bank;
a debit card account;
a credit union; or
a credit card account.

17. The system for providing relative financial position data of claim 13, wherein;
at least part of the individual's financial data includes financial data selected from the group of financial data consisting of:

the individual's age;
the individual's marital status;
the individual's number of dependents;
the individual's area of residence;
the individual's occupation;
the individual's income;
the individual's average contributions to saving accounts and/or programs over a given time;
the individual's savings account balances;
the individual's average contributions to retirement accounts and/or programs over a given time;
the individual's balances in retirement accounts and/or programs;
the individual's average balances in checking accounts;
the individual's mortgage balances;
the individual's credit card debt;
the individual's unsecured debt;
the individual's mortgage payments;
the individual's equity in real estate;
the individual's stocks and other holdings;
the individual's healthcare expenses;
the individuals spending in defined categories; and
the individuals spending with defined merchants.

18. The system for providing relative financial position data of claim 13, wherein;
at least part of the one or more other individuals' financial data is obtained from a computing system implemented financial management system.

19. The system for providing relative financial position data of claim 13, wherein;
at least part of the one or more other individuals' financial data is obtained from a computing system implemented personal financial management system.

20. The system for providing relative financial position data of claim 13, wherein;
at least part of the one or more other individuals' financial data is obtained from at least two or more of the following sources:
a bank;
a debit card account;
a credit union; or
a credit card account.

21. The system for providing relative financial position data of claim 13, wherein;
at least part of the one or more other individual's financial data includes financial data selected from the group of financial data consisting of:
the individual's age;
the individual's marital status;
the individual's number of dependents;
the individual's area of residence;
the individual's occupation;
the individual's income;
the individual's average contributions to saving accounts and/or programs over a given time;
the individual's savings account balances;
the individual's average contributions to retirement accounts and/or programs over a given time;
the individual's balances in retirement accounts and/or programs;
the individual's average balances in checking accounts;
the individual's mortgage balances;
the individual's credit card debt;
the individual's unsecured debt;
the individual's mortgage payments;
the individual's equity in real estate;
the individual's stocks and other holdings;
the individual's healthcare expenses;
the individuals spending in defined categories; and
the individuals spending with defined merchants.

22. The system for providing relative financial position data of claim 13, wherein;
at least one of the one or more financial categorization criteria/parameters defined to identify similarly situated individuals includes a financial categorization criterion/parameter selected from the group of financial categorization criteria/parameters consisting of:
age;
marital status;
number of dependents;
area of residence;
occupation;
income;
average contributions to saving accounts and/or programs over a given time;
savings account balances;
average contributions to retirement accounts and/or programs over a given time;
balances in retirement accounts and/or programs;
average balances in checking accounts;
mortgage balances;
mortgage payment;
credit card debt;
unsecured debt;
equity in real estate;
stocks and other holdings;
healthcare expenses;
spending in defined categories; and
spending with defined merchants.

23. The system for providing relative financial position data of claim 13, wherein;
the at least part of the first individual's financial data is compared with at least part of the financial data associated with the one or more similarly situated individuals in at least one financial selected form the group of financial categories consisting of:
income;
average contributions to saving accounts and/or programs over a given time;
savings account balances;
average contributions to retirement accounts and/or programs over a given time;
balances in retirement accounts and/or programs;
balances in checking accounts;
mortgage payments;
mortgage balances;
credit card debt;
unsecured debt;
equity in real estate;
stocks and other holdings;
healthcare expenses;
spending in defined categories; and
spending with defined merchants.

24. The system for providing relative financial position data of claim 13, wherein;
the graphical display indicating the first individual's financial position relative to the one or more similarly situated individuals is a graphical display selected for the group of graphical display consisting of:
a thermometer;
a sliding scale;
any figure or symbol
a partially filled figure or symbol;
an outline of a figure or symbol;
a partially filled outline of a figure or symbol;
a graphical caricature of a person or thing; and
an avatar.

* * * * *